(12) United States Patent
Warzelhan et al.

(10) Patent No.: US 9,153,110 B2
(45) Date of Patent: Oct. 6, 2015

(54) VIDEO SURVEILLANCE SYSTEM AND METHOD FOR CONFIGURING A VIDEO SURVEILLANCE SYSTEM

(75) Inventors: Jan Karl Warzelhan, Bad Salzdetfurth Ot Heinde (DE); Matthias Koenig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 463 days.

(21) Appl. No.: 13/189,700

(22) Filed: Jul. 25, 2011

(65) Prior Publication Data

US 2012/0019659 A1     Jan. 26, 2012

(30) Foreign Application Priority Data

Jul. 23, 2010    (DE) .......................... 10 2010 038 341

(51) Int. Cl.
    *H04N 7/00*           (2011.01)
    *G08B 13/196*       (2006.01)
    *H04N 7/18*           (2006.01)

(52) U.S. Cl.
    CPC ............ *G08B 13/19615* (2013.01); *H04N 7/18* (2013.01)

(58) Field of Classification Search
    CPC .......... H04N 7/181; H04N 7/183; H04N 7/18
    USPC .......................................... 348/143; 382/103
    See application file for complete search history.

(56) References Cited

U.S. PATENT DOCUMENTS

| 6,998,987 | B2 | 2/2006 | Lin |
| 2006/0268108 | A1 | 11/2006 | Abraham |
| 2008/0004073 | A1 | 1/2008 | John et al. |
| 2008/0273754 | A1* | 11/2008 | Hick et al. ................... 382/103 |
| 2011/0181716 | A1* | 7/2011 | McLeod et al. ............... 348/143 |
| 2012/0323364 | A1* | 12/2012 | Birkenbach et al. .......... 700/257 |

FOREIGN PATENT DOCUMENTS

| CN | 101577726 | 11/2009 |
| JP | 2003050107 | 2/2003 |
| TW | 200816794 | 4/2008 |
| TW | 200908667 | 2/2009 |

OTHER PUBLICATIONS

Yilmaz, ACM Computing Surveys, vol. 38, No. 4, Article 13, Publication date: Dec. 2006.*
Ballagas et al. "The smart phone: a ubiquitous input device," Pervasive Computing, IEEE , vol. 5, No. 1, pp. 70,77, Jan.-Mar. 2006.*

* cited by examiner

*Primary Examiner* — Jay Patel
*Assistant Examiner* — Frank Huang
(74) *Attorney, Agent, or Firm* — Michael Best & Friedrich LLP

(57) ABSTRACT

A video surveillance system 1 having an input device 6. The input device includes an analysis device 12 for evaluating images of a surveillance scene from a surveillance region 5, that have been recorded by a surveillance camera 3 A user 7 is represented and/or can be represented on the images, and the analysis device 12 and/or the input device 6 are/is designed for generating user object data 14, based on the images 13 with the user 7 and/or the input device 6. The input device is embodied as a mobile device 6 for the configuration of the video surveillance system 1 by the user 7 on the basis of or using the user object data 14.

10 Claims, 3 Drawing Sheets

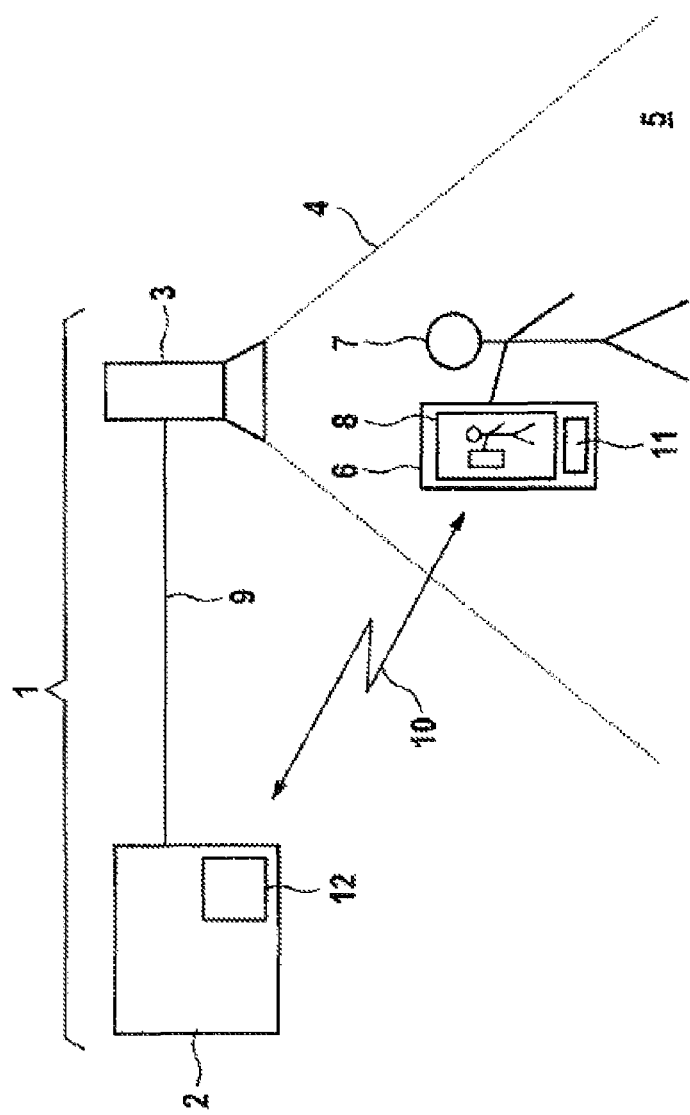

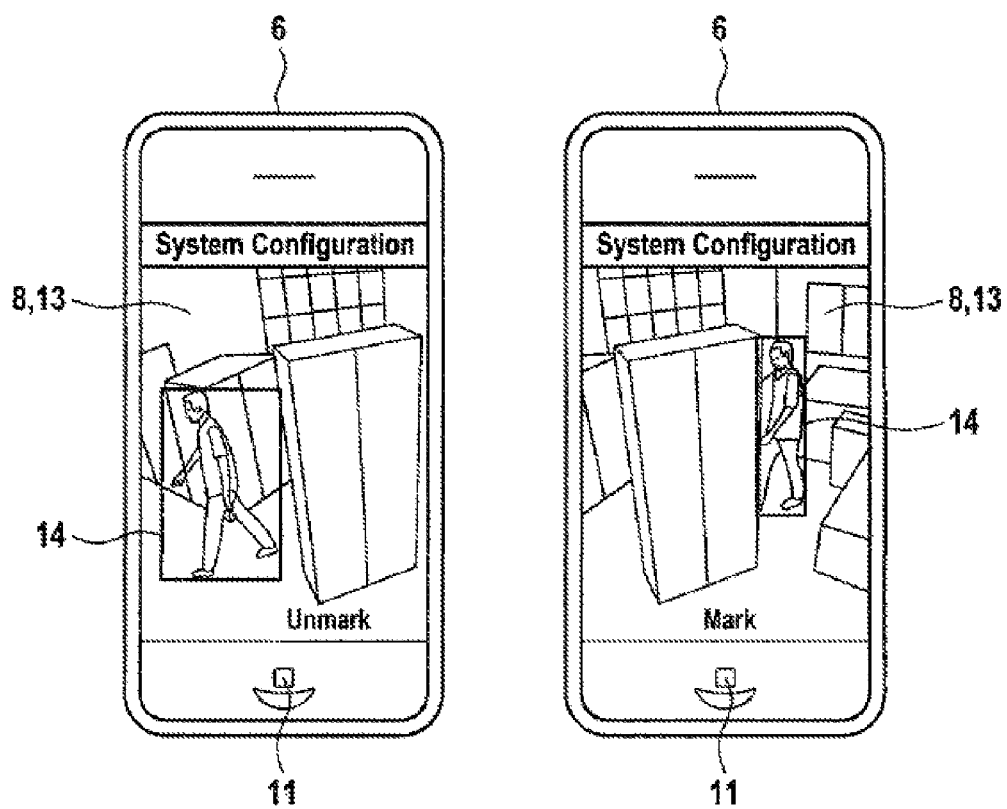

VIDEO SURVEILLANCE SYSTEM AND METHOD FOR CONFIGURING A VIDEO SURVEILLANCE SYSTEM

BACKGROUND OF THE INVENTION

The invention relates to a video surveillance system comprising an input device comprising an analysis device for evaluating images of a surveillance scene from a surveillance region, said images having been recorded by a surveillance camera, wherein a user is represented and/or can be represented on the images, wherein the analysis device and/or the input device are/is designed for generating user object data, which are generated on the basis of the images with the user and/or the input device—both called user images hereinafter. The invention also relates to a method for configuring a or the video surveillance system.

Video surveillance systems usually have one or more surveillance cameras arranged in a surveillance region. The surveillance cameras record images of the surveillance region and forward said images into a control center, for example, where the images are evaluated optionally by surveillance personnel or in an automated fashion. Automated evaluation often employs automatic image analysis methods based on the interplay of various algorithms such as, for example, image segmentation, tracking of objects or the classification of objects.

The results of the automated evaluation are provided, for example, in the control center itself or via web-browser-based solutions.

One example of a video surveillance system is described in the document DE 10 2005 0217 35 A1, which probably forms the closest prior art. Said video surveillance system comprises a plurality of surveillance cameras, which are connected to a surveillance control center via a network. In the surveillance control center, the video recordings from the surveillance cameras can be linked with outline layout data of the surveillance region. In accordance with the document, setting up the surveillance cameras in the surveillance system is associated with a high outlay since this comprised inputting the camera view point and the detection regions of the surveillance cameras in an overview plan of the surveillance regions. For simplification it is proposed that the setting-up engineer depicts edges of the outline layout interactively into the video image from a surveillance camera.

SUMMARY OF THE INVENTION

The invention presents a video surveillance system which is suitable and/or designed for monitoring a surveillance region such as, for example, individual rooms of a building, places, roads, etc. The video surveillance system is coupled and/or can be coupled to at least one surveillance camera, preferably some surveillance cameras, for example more than 10, 20 or 50 surveillance cameras. In one preferred embodiment of the invention, the video surveillance system comprises the at least one surveillance camera.

The video surveillance system comprises an input device and also an analysis device, which is designed for evaluating images of a surveillance scene from the surveillance region, said images having been recorded by the at least one surveillance camera. A user can be represented on the images. It is preferably provided that the analysis device in later operation performs the actual automated evaluation of the images of the surveillance scene. In the context of the automated evaluation, e.g. surveillance objects such as persons, for example, are detected and tracked. If appropriate, e.g. by the application of behavior rules, suspicious behavior of the surveillance objects is identified and a monitoring signal, e.g. an alarm, is output.

The analysis device and/or the input device are/is designed for generating user object data, which are generated on the basis of the images with the user and/or the input device—called user images hereinafter. Usually, this task should be performed by the analysis device since the latter also performs this task in later operation. Optionally, however, it can also be provided that the input device generates the user object data. The user object data are generated on on the basis of the user images, preferably with the aid of digital image processing, in particular by means of object detection, object segmentation and/or object classification.

According to the invention, it is proposed that the input device is embodied as a mobile, in particular wireless and/or portable device, for the configuration of the video surveillance system by the user on the basis of or using the user object data, in particular, the mobile device is designed for exchanging data with the video surveillance system, in particular with the analysis device, via a radio connection or wireless connection, e.g. WLAN, Bluetooth GSM, UMTS, infrared.

As a result of the embodiment as a mobile device, the input device enables the configuration of the video surveillance system from any desired position. That affords the advantage that the configuration of the video surveillance system need not necessarily be carried out by a control center or directly at the analysis device. Moreover, the configuration is carried out on the basis of or using user object data, such that the user, during the configuration, by virtue of said user's own presence in the surveillance scene, can generate user object data and can use the latter immediately by means of the mobile device for the configuration of the video surveillance system. In particular, the configuration of the video surveillance system can be carried out if the user is situated in the surveillance scene. The user can form, for example, a calibration body for the surveillance scene, wherein the generation of the user object data is simplified by virtue of the fact that the latter are generated on the basis of the knowledge of parameters of the user and hence using a priori knowledge.

In particular, it is possible that, during the configuration of the video surveillance system, a feedback loop between the user and the video surveillance system is effected via the mobile device, wherein the video surveillance system supplies user object data as results to the user onto the mobile device, wherein said user can confirm or correct the results.

The configuration of the video surveillance system preferably comprises the setting of camera data, in particular the location and/or the orientation of the surveillance camera and/or the camera parameters thereof. Optionally in addition, the configuration can also comprise the initialization of ambient data, such as e.g. the definition of a basic area, boundaries, stationary objects.

By means of the mobile device, therefore, the configuration can be greatly simplified, e.g. during the initialization and start-up of the video surveillance system. Many tasks for setting the video surveillance system have to be accomplished nowadays laboriously via graphical user interfaces on a computer, in particular on the analysis device, for example, calibration of the scene, marking of regions, etc. These tasks can now be accomplished more simply by the interplay between the user, who preferably moves in the surveillance scene with the mobile device, and the video surveillance system. In this case, the video surveillance system can utilize the advantage of using the user as a calibration object.

In one particularly preferred embodiment of the invention, the user images show the user with the mobile device carried visibly or invisibly. This functional embodiment of the invention again underlines the inventive concept that the user, during the configuration, firstly can be situated in the surveillance scene and secondly can optionally be utilized in addition as a calibration body. In this way, the surveillance camera which is assigned to the surveillance scene and in which the user is situated can be calibrated very effectively in the context of the configuration of the video surveillance system.

Particularly preferably, the mobile device is embodied as a handheld device, smartphone or some other portable unit which the user can carry along in a simple manner, for example with just one hand. Since the user together with the mobile device also moves in the surveillance scene, the compact design of the mobile device facilitates the operating sequence.

In one advantageous development of the invention, the user object data comprise a detection information item, a position, a size, a trajectory and/or a segmentation information item of the user in the user images. By way of example, said user object data are generated and displayed in any desired manner on the mobile device, such that the user can confirm, optionally correct or reject said data.

Particularly preferably, the mobile device is designed to display the surveillance scene, in particular with the user, as a graphical representation, wherein the user object data are preferably represented visually. The user object data could be embodied, for example, as a so-called bounding box, that is to say as a rectangle enclosing the user or as a parallelepiped enclosing the user, which is superimposed on the surveillance scene. During operation, it can be provided that the user confirms, optionally corrects or rejects these user object data represented.

In this case, it is optionally possible for the graphical representation and/or the user object data to be embodied as a symbol representation, a real representation or a combination thereof.

In particular, the configuration of the video surveillance system, in particular of the surveillance camera which records the surveillance scene with the user, comprises an interactive inputting, a selection or a confirmation of user object data.

In one possible development of the invention, the mobile device comprises a self-locating device designed for outputting self-locating information items, wherein the self-locating information items are used in the generation of the user object data, e.g. the position of the user. By way of example, the user with the mobile device is detected and the mobile device transmits a self-locating information item, in particular the actual position of the mobile device and thus of the user, to the video surveillance system. Such a self-locating device can be, for example, a possibility for global position determination such as, for example, GPS or WLAN localization. It is also possible for the video surveillance system to be designed for recording trajectories, that is to say a sequence of a plurality of self-locating information items, and for linking them with user object data. It is likewise possible to describe the surveillance scene in the self-locating information items as coordinates and to supply further data for the configuration and/or calibration of the video surveillance system.

In one possible development of the invention, the video surveillance system comprises a marking device, wherein the user images show the user with the visible marking device, and wherein the marking device is used in the user images in the generation of the user object data. Such a marking device simplifies the generation of user object data since the user, in particular the latter's position, orientation, etc., can be identified more reliably and more rapidly by means of the marking device.

In a first possibility it can be provided that the mobile device carries the marking device. This is advantageous particularly when the mobile device additionally comprises the self-locating device. In another possibility, the user carries the marking device, for example a marking jacket, which can be identified in an automated fashion in a simple manner. In particular, the information concerning the appearance of the marking device has been transferred to the video surveillance system beforehand.

In one possible development of the invention, the video surveillance system has a concealment function, wherein the mobile device is designed for inputting a concealment status signaling a concealment of the user in the surveillance scene, wherein the concealment status is used in the generation of the user object data and/or during the configuration. Concealments occur if objects, for example persons or vehicles, move through the surveillance scene firstly in front of and then (in part) behind an obstacle such as, for example, a container, a tree, a switch box, etc. In this case, an automated recognition system often poses problems since it cannot automatically recognize in a simple manner that only part of the object is visible. The user moving in the surveillance scene can convey to the video surveillance system, by means of the concealment function, when said user enters or leaves the region that is not visible or is only partly visible from the surveillance camera. This additional information that the user as object is partly concealed can advantageously be used in the generation of user object data.

Particularly preferably, it is provided that the video surveillance system has a learning function, wherein the mobile device is designed for inputting a learning status signaling an object behavior to be learned, wherein the learning information derived by the learned object behavior is used in the generation of behavior rules, in particular alarm rules. By means of this function, e.g. an automatic alarm activation by the video surveillance system can be "trained" by the user. The user can carry out an activity, for example entering a specific region, and convey to the video surveillance system in the process that an alarm is intended to be triggered in the case of such activities.

In one possible development of the invention, the mobile device has a camera for recording the surveillance region as additional images, wherein the additional images are used for configuring the video surveillance system. This additional camera allows the temporary use for methods from a "multi-view geometry", which can help to supply positions and extents of static or stationary objects.

A further subject of the invention relates to a method characterized in that the user configures the video surveillance system in the field of view of the surveillance camera, in particular configures the surveillance camera in whose field of view said user is situated.

It is particularly preferred if the user configures the video surveillance system on the basis of user images, which are displayed in real time. Consequently, the user can "see" themselves in the surveillance scene and support the configuration of the video surveillance system with the user's own position in the surveillance scene. Real time is preferably understood to mean user images recorded less than 30 seconds ago, in particular less than 20 seconds ago, and more specifically less than 10 seconds ago. It is also possible for hard real-time operation to be present, such that the user images are represented with a temporal delay of less than 3 seconds, preferably less than 2 seconds, and in particular less than 1 second.

BRIEF DESCRIPTION OF THE DRAWINGS

Further features, advantages and effects of the invention will become apparent from the following description of a preferred exemplary embodiment of the invention and the accompanying figures, in which:

FIG. 1 shows a schematic block illustration of a video surveillance system as one exemplary embodiment of the invention;

FIGS. 2a, b show a schematic illustration of the mobile device in FIG. 1;

DETAILED DESCRIPTION

Figure 3A:
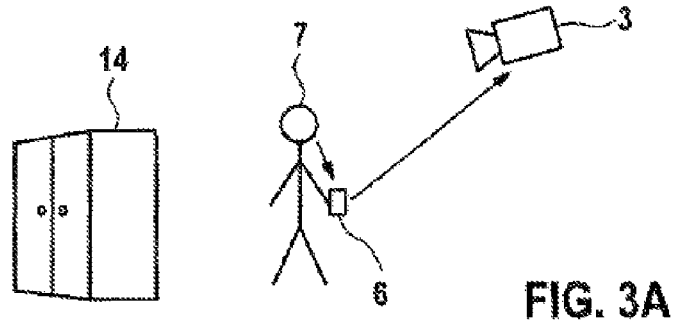
FIGS. 3a-c show a schematic visualization of the functioning of the configuration of the video surveillance device.

FIG. 1 shows, in a schematic block illustration, a video surveillance system 1, which can be used for monitoring buildings such as, for example, museums, offices, prisons, etc. as surveillance region 5. The video surveillance system 1 comprises a control center 2, which is connected to one or a plurality of surveillance cameras 3. While only a single surveillance camera 3 is illustrated in FIG. 1, the control center 2 can also be connected to further surveillance cameras. The surveillance camera 3 is directed with its field of view 4 at part of the surveillance region 5. This part of the surveillance region 5 is recorded as an image, wherein the imaging of this surveillance region 5 is then designated as surveillance scene.

The video surveillance system 1 furthermore comprises a mobile device 6, which can be transported by a user 7. The mobile device 6 is embodied, for example, as a handheld device, smartphone or the like and comprises, in particular, a screen 8. The surveillance camera 3 is connected to the control center 2 via a wireless or cable-based network 9, and the mobile device 6 is bidirectionally connected to the control center 2 via a wireless connection 10.

Alongside the screen 8, the mobile device 6 has an input panel 11, which can be embodied as one or a plurality of buttons, keyboard, touch screen or, in alternative embodiments, as some other human-machine interface (HMI).

The video surveillance system 1 comprises an analysis device 12, which is designed to evaluate the images transmitted by the surveillance camera 3 and via the network 9 by means of digital image processing in an automated fashion. Various algorithms such as, for example, algorithms for detection, segmentation, tracking and/or classification of moving objects, in particular of surveillance objects, such as persons or vehicles, for example, are carried out in this case. The complexity associated therewith usually requires the installation of the video surveillance system 1 to be associated with a setting phase with regard to the respective surveillance scene represented in the image. During the initialization or start-up of the video surveillance system 1, it is therefore necessary to configure, in particular to calibrate, said system. In this case, ambient data and camera data are made available to the video surveillance system 1, which data allow the video surveillance system 1 to be able to convert image coordinates from the surveillance scene into world coordinates.

The mobile device 6 allows, during the configuration of the video surveillance system 1, a feedback loop to be established between the user 7 and the video surveillance system 1, in particular the analysis device 12. For this purpose, images of the user 7, which are designated hereinafter as user images, are recorded by the surveillance camera 3 and supplied to the analysis device 12 via the network 9. The analysis device 12 generates from the user images user object data relating, for example, to a position, size etc. of the user 7. Via the wireless connection 10, the user images and/or the user object data are supplied to the mobile device 6 and represented by way of the screen 8. In this example, the screen 8 shows the user 7 with the mobile device 6.

Via the input panel 11, the user 7 can directly and interactively confirm the user object data, correct them or, if appropriate, reject them, if the analysis device 12, for example, has formed user object data which are not actually connected with the user 7 and thus represent an incorrect evaluation.

FIGS. 2a, b show the mobile device 6 with a surveillance scene represented by way of example, showing a user image 13 with the user 7. As user object data, the representation of the user 7 was surrounded with a frame 14 (bounding box). The user 7 can now—if the frame 14 is positioned correctly—confirm said frame or—if the latter is not positioned correctly—reject or shift said frame. This interactive control of the results of the analysis device 12 significantly simplifies the configuration of the video surveillance system 1, since it is possible to immediately correct incorrect interpretations by the analysis device 12.

By way of example, the user 7 can move through the surveillance region 5. As a result of knowledge of the size of the user 7 and definition, automatically as user object data or by means of interaction via the mobile device 6, of the foot and head points of the user 7, parameters for the calibration of the surveillance scene and of the surveillance camera 3 (for example depth information) are supplied.

If the mobile device 6 has a possibility for global position determination (for example GPS or WLAN localization), these position information items can be tracked as self-locating information items when the user 7 passes through the surveillance region 5. This means that, later, events can be directly linked with these information items about the location and can be evaluated. Likewise, the surveillance region 5 can be described in these coordinates in a simple manner and these positions additionally supply further data for calibration and thus for configuration of the video surveillance system 1.

Figure 3B:
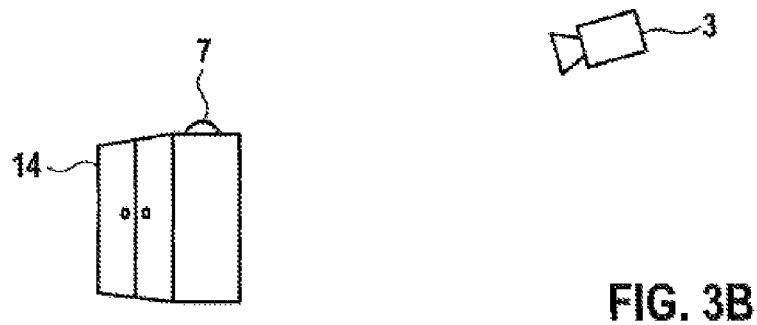
Figure 3C:
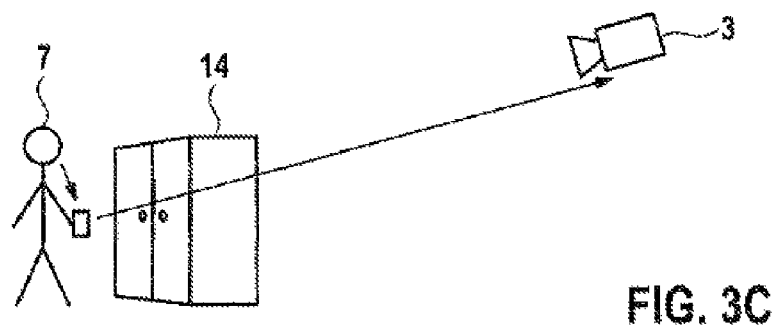

A further possible field of application concerns the identification of concealments which occur if objects, for example persons, vehicles, move through the surveillance region 5 firstly in front of and then in part behind an obstacle (for example container, tree, switch box). This situation is illustrated for example in FIGS. 3a-c. FIG. 3a illustrates the user 7 with the mobile device 6 in front of a cabinet 14, wherein the user 7 is recorded by the surveillance camera 3 in an unconcealed manner. In FIG. 3b, the user is situated behind the cabinet 14 and is concealed by the latter. In FIG. 3c, the user emerges again from behind the cabinet 14.

By means of interactive inputting into the mobile device 6, the user 7 can initiate a concealment signal or convey a concealment status, which is forwarded to the analysis device 12, such that this can take account of the fact that the user 7—as shown in FIG. 3b—can be seen only in part or cannot be seen at all. This enables object detection or tracking of the user 7 by the analysis device 12 to be greatly simplified.

A further application concerns an automatic alarm activation by the video surveillance system 1, which can be trained by the user 7. The user 7 can carry out an activity, for example entering a specific region, and convey to the video surveillance system 1 in the process that an alarm is intended to be triggered in the case of such activities. For this purpose, the user 7 actuates the input panel 11 before or during the activity, thus indicating to the analysis device 12 that the activity in progress is intended to trigger the alarm. The analysis device 12 is designed to learn this activity as an alarm condition within the scope of behavior rules and to use it as an alarm condition during later monitoring of the surveillance region 5.

The mobile device 6 can optionally have an integrated further camera, which provides a temporary, further video source for the video surveillance system 1, in particular for the analysis device 12. This additional camera allows the temporary use for methods from multi-view geometry, which can then help to supply positions and extent of static objects.

The communication between the mobile device 6 and the control center 2 can take place via conventional encrypted radio connection, that is to say by means of WiFi, W-LAN or GRPS, 3G, etc. and higher protocols. As usual, this will be able to be done using software to be installed on the control center 2 as server and the mobile device 6 as client.

The identification of the user 7 in the surveillance scene or in the surveillance region 5 can take place during the configuration of the video surveillance system 1 by means of an interplay of a feedback loop between control center 2 and mobile device 6. The analysis device 12 carries out the conventional methods such as detection, segmentation and tracking. The results of the analysis device 12 are supplied as user object data to the mobile device 6 and are visually displayed to the user 7. The user 7 then chooses where the latter is situated in the represented region of the surveillance scene. Said user supplies the assignment between the segmented object and said user's person. This choice takes place for example in the case of a simple graphical user interface on the screen 11 of the mobile device 6. Afterward, the mobile device 6 transmits this information e.g. in image coordinates to the analysis device 12 and the latter can then track the user 7 during further activities or actions. Abovementioned functions, for example GPS information items, are in this case transmitted automatically from the mobile device 6 to the control center 2 and thus to the analysis device 12. Other functions may require the selection of the function on the mobile device 6 by means of the user 7, for example switching the learning mode of the analysis device 12 on and off. It is likewise conceivable for the user 7 to wear a specific garment (for example a colored jacket) which can be readily recognized by the video surveillance system 1. In this way, the video surveillance system 1 can rapidly evaluate the segmentation results and ascertain which result includes the user 7.

The invention claimed is:

1. Video surveillance system comprising:
    a mobile device including a screen configured to receive data input by a user; and
    an analysis device configured to evaluate images of a surveillance scene from a surveillance region recorded by a surveillance camera, and to generate user object data based on images including a user;
    wherein the mobile device is positioned in the surveillance region and is used to configure the video surveillance system using the user object data;
    wherein the images show the user with the mobile device carried visibly or invisibly;
    wherein the mobile device is designed to display the surveillance scene as a graphical representation, wherein the user object data are represented graphically, and the graphical representation is embodied as a symbol representation, a real representation or a combination thereof; and
    wherein the mobile device is configured for inputting a concealment status signaling a concealment of the user in the surveillance images, wherein the concealment status is used in the generation of the user object data.

2. The video surveillance system according to claim 1, characterized in that the mobile device is embodied as a radio-based device for communication with the video surveillance system.

3. The video surveillance system according to claim 2, characterized in that the mobile device communicates with the analysis device.

4. The video surveillance system according to claim 2, characterized in that the mobile device is a handheld device.

5. The video surveillance system according to claim 1, characterized in that the user object data comprise a detection information item, a position, a size, a trajectory and/or a segmentation information item of the user in the user images.

6. The video surveillance system according to claim 1, characterized in that the configuration comprises an interactive inputting, a selection or a confirmation of user object data.

7. The video surveillance system according to claim 1, characterized in that the mobile device includes a self-locating device for outputting self-locating information items, wherein the self-locating information items are used in the generation of the user object data.

8. The video surveillance system according to claim 1, characterized by a marking device, wherein the images show the user with the visible marking device, and wherein the marking device is used in the images in the generation of the user object data.

9. The video surveillance system according to claim 1, characterized by a learning function, wherein the mobile device is designed for inputting a learning status signaling an object behavior to be learned, wherein the object behavior is used in the generation of behavior rules.

10. The video surveillance system according to claim 1, characterized in that the mobile device has a camera for recording the surveillance region as additional images, wherein the additional images are used for configuring the video surveillance system.

* * * * *